(12) United States Patent
Stuever

(10) Patent No.: US 9,566,551 B2
(45) Date of Patent: Feb. 14, 2017

(54) FLUE GAS TREATMENT USING KRAFT MILL WASTE PRODUCTS

(71) Applicant: S&S Lime, Inc., Eufaula, OK (US)

(72) Inventor: John C. Stuever, Eufaula, OK (US)

(73) Assignee: S&S Lime, Inc., Eufaula, OK (US)

( * ) Notice: Subject to any disclaimer, the term of this patent is extended or adjusted under 35 U.S.C. 154(b) by 0 days.

(21) Appl. No.: 15/172,255

(22) Filed: Jun. 3, 2016

(65) Prior Publication Data

US 2016/0279568 A1 Sep. 29, 2016

Related U.S. Application Data

(63) Continuation-in-part of application No. 14/528,833, filed on Oct. 30, 2014, now Pat. No. 9,468,900, which is a continuation of application No. 13/943,335, filed on Jul. 16, 2013, now abandoned.

(60) Provisional application No. 62/171,430, filed on Jun. 5, 2015.

(51) Int. Cl.

| | |
|---|---|
| *B01D 53/83* | (2006.01) |
| *B03C 3/013* | (2006.01) |
| *B01D 53/64* | (2006.01) |
| *B01D 53/08* | (2006.01) |
| *B01J 20/20* | (2006.01) |
| *B01D 53/02* | (2006.01) |
| *B01D 53/68* | (2006.01) |
| *C01B 31/08* | (2006.01) |
| *C01B 31/12* | (2006.01) |
| *C01F 11/18* | (2006.01) |
| *B01J 20/30* | (2006.01) |
| *B01D 53/06* | (2006.01) |
| *B01D 53/50* | (2006.01) |
| *B01D 53/77* | (2006.01) |

(52) U.S. Cl.
CPC ........... *B01D 53/83* (2013.01); *B01D 53/02* (2013.01); *B01D 53/08* (2013.01); *B01D 53/508* (2013.01); *B01D 53/64* (2013.01); *B01D 53/685* (2013.01); *B01J 20/20* (2013.01); *B01J 20/3071* (2013.01); *B03C 3/013* (2013.01); *C01B 31/08* (2013.01); *C01B 31/12* (2013.01); *C01F 11/185* (2013.01); *B01D 53/06* (2013.01); *B01D 53/505* (2013.01); *B01D 53/77* (2013.01); *B01D 2251/108* (2013.01); *B01D 2251/404* (2013.01); *B01D 2251/606* (2013.01); *B01D 2253/102* (2013.01); *B01D 2253/304* (2013.01); *B01D 2257/2045* (2013.01); *B01D 2257/302* (2013.01); *B01D 2257/504* (2013.01); *B01D 2257/602* (2013.01); *B01D 2258/0283* (2013.01); *B01D 2259/40001* (2013.01); *B01D 2259/80* (2013.01); *C01P 2004/60* (2013.01)

(58) Field of Classification Search
CPC ......... B01D 53/83; B01D 53/08; B01D 53/64; B01D 2253/102; B01D 2259/40001; B01D 2257/602; B01D 2258/0283; B01D 2257/302; B01D 2257/504; B01D 2251/108; B03C 3/013
See application file for complete search history.

(56) References Cited

U.S. PATENT DOCUMENTS

| | | | |
|---|---|---|---|
| 6,284,199 B1 * | 9/2001 | Downs | B01D 47/06 422/168 |
| 2003/0053946 A1 * | 3/2003 | Olsen | C01F 11/185 423/432 |

OTHER PUBLICATIONS

Fuels—Exhaust Temperatures, accessed online at http://www.engineeringtoolbox.com/fuels-exhaust-temperatures-d_168.html on Oct. 1, 2016.*

* cited by examiner

*Primary Examiner* — Daniel C McCracken

(57) ABSTRACT

The present invention relates in general to a process for removing mercury from a mercury-containing flue gas using dregs from a Kraft pulp mill green liquor clarifier. The dregs are washed with water to produce a particulate carbon slurry which is activated with hydrobromic acid and injected into a mercury-containing flue gas to oxidize and adsorb the mercury at temperatures less than about 900° F. A slurry of sodium hydroxide and calcium carbonate, optionally also obtained from Kraft mill waste, is injected into the hot flue gas to absorb and remove $CO_2$, $SO_2$, and $SO_3$.

12 Claims, No Drawings

FLUE GAS TREATMENT USING KRAFT MILL WASTE PRODUCTS

CROSS-REFERENCE TO RELATED APPLICATIONS/INCORPORATION BY REFERENCE STATEMENT

This application claims priority to U.S. Provisional Application No. 62/171,430 filed Jun. 5, 2015, and is a continuation-in-part of U.S. Ser. No. 14/528,833 filed Oct. 30, 2014; which is a continuation of U.S. Ser. No. 13/943,335 filed Jul. 16, 2013, now abandoned. Each of the above-referenced patent applications is hereby expressly incorporated herein in its entirety.

BACKGROUND OF THE INVENTIVE CONCEPTS

1. Field of the Inventive Concepts

The presently disclosed inventive concept(s) relates generally to methods for removing sulfur, carbon dioxide, and mercury from flue gases, and more particularly, but not by way of limitation, to a methods for removing sulfur, carbon dioxide, and mercury from fossil fuel burning power plant flue gases using waste products from a Kraft mill.

2. Brief Description of Related Art

The combustion of fossil fuels produces gaseous emissions of $CO_2$ and $SO_2$. $CO_2$ is a "greenhouse" gas which can contribute to global warming. $SO_2$ is a source of acid rain. Flue gas emissions can also include mercury. Emission of mercury is tightly regulated, mainly due to its high toxicity. A number of processes have been developed or suggested for removing these contaminants from flue gases. However, costs are typically high and removal efficiencies are not consistent. There remains a need for lower cost and improved efficiency methods for $CO_2$, $SO_2$, and mercury removal from flue gases.

SUMMARY OF THE DISCLOSURE

The present invention relates in general to a process for removing mercury from a mercury-containing flue gas using dregs from a pulp mill green liquor clarifier. The dregs are optionally washed with water to produce a particulate carbon slurry which can be activated with hydrobromic acid and injected into a mercury-containing flue gas to oxidize and adsorb the mercury. A sodium hydroxide and calcium carbonate slurry, optionally obtained from pulp mill waste, are injected into the hot flue gas to absorb and remove $CO_2$, $SO_2$, and $SO_3$.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purposes of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The dominant process for chemical pulping in the paper industry is the alkaline "Kraft" process which uses sodium hydroxide and sodium sulfide as the primary chemical constituents. Kraft mill processing is described in detail in U.S. Pat. No. 8,557,731, the content of which is incorporated herein by reference. The Kraft pulping process combines sodium hydroxide and sodium sulfide with organic wood matter. The sodium hydroxide and sodium sulfide solubilize the lignin in the organic wood matter thereby releasing the wood fibers. The solubilized lignin, excess sodium hydroxide and sodium sulfide, and other trace impurities are washed out of the wood fibers and processed in a recovery boiler.

In order to make the Kraft pulping process economically feasible, the chemicals are regenerated in a series of steps, including: 1) washing the spent chemicals and digested wood substance out of the "pulp" and collecting the resultant "weak black liquor" in large tanks; 2) evaporating the liquor in preparation for burning in a Kraft recovery boiler which produces steam for energy recovery and molten "smelt" for chemical recovery, wherein the smelt is mixed with water to form "green liquor" containing sodium carbonate and sodium sulfide; 3) the sodium carbonate is reconverted to sodium hydroxide by using calcium oxide wherein the calcium oxide is converted into a finely divided calcium carbonate called "lime mud" suspended in a regenerated pulping liquor commonly referred to as "white liquor"; and 4) the calcium oxide is regenerated by burning the lime mud in a lime kiln. Before the lime mud can be burned in a cost-effective way, however, the lime mud must be separated from the regenerated pulping liquor and washed. After intensive washing, the lime mud contains primarily calcium carbonate with trace amounts of calcium hydroxide and sodium hydroxide. The calcium carbonate in the lime mud ranges in size from less than 1 micron to greater than 120 microns.

In the recovery boiler, the organic matter is burned off and sodium carbonate and sodium sulfide are produced. The sodium carbonate and sodium sulfide combination is generally referred to as "smelt." The smelt is mixed with water to form a slurry commonly referred to as a "Green Liquor" containing dissolved sodium carbonate and sodium sulfide, as well as some solids. The solids are removed from the Green Liquor in a clarifier and are commonly referred to as Green Liquor dregs (GLds). The GLds contain a substantial portion of particulate carbon as well as calcium carbonate and metal sulfides.

The particulate carbon in the GLds has properties similar to and sometimes superior to conventional activated carbon. "Activated carbon" is generally defined herein as carbon, or a substantially carbon-containing mixture, having an exceptionally high surface area. For example, one gram of activated carbon can have a surface area in the range of about 500 $m^2$ to about 1500 $m^2$ per gram of activated carbon. It has been found that the particulate carbon in the GLds can be very useful for removal of mercury from flue gases such as coal fired flue gases. Additionally, liquid present in the GLds is primarily sodium hydroxide and this sodium hydroxide can be used to capture $CO_2$ from flue gases.

The precipitated calcium carbonate, also referred to as "lime mud," is separated from the White Liquor in a White Liquor clarifier. Kraft pulp mill lime mud is a finely divided calcium carbonate precipitate that can be used for removal of acid flue gases. By removing these unwanted fines from the pulp mill, the pulp mill waste is reduced and the steps of lime mud washing, precoat filtering, and burning the precipitate in a lime kiln can be eliminated. Additionally, the Kraft pulp mill lime mud has been found to be superior to conventional lime sources for removal of acid flue gases in part because the pulping system has removed the abrasive silica present in the limestone.

In one embodiment, the lime mud is removed from the Kraft mill between the white liquor clarifier and the mud mixer where water is added. This provides some dissolved sodium hydroxide, sodium carbonate and precipitated lime fines as well. The removed lime mud can be transferred to a power plant producing a flue gas and injected into the flue gas stream anywhere after an economizer area in the power plant flue gas system. For example, the lime mud can be injected before or after an electrostatic precipitator (ESP) filter and before a baghouse for capturing solids from the power plant flue gas.

In another embodiment, the lime mud is removed from the Kraft mill after it is washed and before it is calcined.

In one embodiment, between 10% and 100% of a Kraft mill lime mud is removed and transferred to one or more power plants for injection into the flue gas. When a majority of a Kraft mill's lime mud is removed, it may be necessary to mill particles larger than 12 microns.

Processes are presently described for removing mercury from a mercury-containing flue gas using dregs from a Kraft pulp mill green liquor clarifier. The carbon in the dregs can be activated with hydrobromic acid and injected into a mercury-containing flue gas to oxidize and adsorb the mercury. The dregs can be injected with pulp mill liquor, or the solids can be washed with water first. A sodium hydroxide and calcium carbonate slurry, optionally also obtained from a Kraft pulp mill or pulp mill waste as described above, is injected into the hot flue gas to absorb and remove $CO_2$, $SO_2$, and $SO_3$.

Earlier attempts to remove mercury from flue gas with bromine and bromine compounds were unsuccessful below a temperature of 500° C. (about 940° F.). These methods are discussed in detail in U.S. Pat. No. 6,878,358. It was discovered, however, that particulate carbon produced typically as a waste product from a Kraft pulp mill is capable of oxidizing and adsorbing mercury from flue gases, when used with a halide such as bromine, at temperatures significantly lower than previously thought possible.

In one embodiment, green liquor dregs from a green liquor clarifier are further processed in a liquid/solids separator at a Kraft pulp mill. Nonlimiting examples of a liquid/solids separator include a filter, centrifuge, cyclone, or series of decanter centrifuges.

In one embodiment, a centrifuge or series of decanter centrifuges remove the carbon and solids from the aqueous sodium hydroxide. The aqueous sodium hydroxide can be returned to the Kraft mill or used for flue gas treatment as described hereinafter. The resulting carbon cake can be mixed with water and fed to a second decanter centrifuge. Wash water removed in the centrifuge can be sent to a waste stream or returned to the green liquor clarifier. This washing process can be repeated until the carbon has much of the lime mud and sodium hydroxide washed out. Water can then be added back to the carbon cake and the slurry can be sent to a storage and shipping tank.

Other materials used for the flue gas treatment system include sodium hydroxide and calcium carbonate. In one embodiment, sodium hydroxide is removed from a separate source at a Kraft pulp mill or is purchased from another industrial source. Lime mud that is normally discarded when fresh lime is added to the Kraft pulp mill can also be used, or Lime can also be purchased elsewhere.

In one embodiment, a milling pump is used to maintain the washed carbon in a de-agglomerated state. The milling pump can also be used to recirculate slurried materials in a storage and shipping tank. Nonlimiting examples of suitable milling pumps include those available from Silverson Machines, Inc.

The above described slurries can be shipped to a coal burning power plant and stored there in holding tanks. Metering pumps, for example, can be used to individually inject the two slurries into the hot side of the flue gas stream. In one embodiment, carbon is injected with a slip stream of hydrobromic acid at a point in the flue gas stream where the flue gas is around 600° F. Typically the injection point is less than 900° F. and can be within a range of 400° F. to about 850° F. At these temperatures, particulate carbon recovered as described from a pulp mill, combined with a bromine-containing compound such as hydrobromic acid, will oxidize elemental mercury present in the flue gas and adsorb mercury on the surfaces of the carbon and in the carbon pores.

A mixture of sodium hydroxide and lime mud or calcium carbonate, obtain from a pulp mill or elsewhere, is also injected into the flue gas stream, typically upstream of the of the carbon injection point. In one embodiment, the mixture of sodium hydroxide and lime mud or calcium carbonate is injected at a point in the flue gas stream where the flue gas is around 800° F. This mixture helps remove CO2, SO2 and SO3 from the gas. The calcium carbonate reacts with SO2 and SO3. Carbon particles still available for additional adsorption not absorb these compounds as well.

All of the materials can be removed from the flue gas using existing or added filters at the power plant, either on the hot or cold side and wet or dry system. For example, existing ESP filters, both hot and cold, can be used to remove the solids.

Heat from the flue gas is used to dry the particulate slurries from the Kraft pulp mill, saving energy in this area as well as cleaning contaminants from the flue gas.

EXAMPLE 1

In a Kraft pulp mill plant test, green liquor is removed from the clarifier using a bottom dregs screw and pump system. The dregs are flowable and at a temperature of about 140° F. The dregs are washed using a three stage group of 50 gpm centrifuges stacked on top of each other. The top or first centrifuge has an internal hydraulic pump which feeds the green liquor dregs into the centrifuge. The centrate can be sent back to the green liquor clarifier or to a recirculating storage tank for shipping to a coal burning or natural gas burning power plant to remove $CO_2$, $SO_2$, $SO_3$ and other harmful discharges.

The cake coming from the first (top) centrifuge is slurried with water from the plant evaporative coolers using an inline spray wash to move the slurry to the next centrifuge. The second centrifuge recovers the solids and sends the liquid back to the green liquor pre-storage tank. The cake solids are sent thru another spray water wash to slurry the cake for the second time before separating the solids in the third final bottom centrifuge.

The liquid from the third centrifuge is pumped to the pre-storage tank and the final washed cake is mixed with water to the desired density and sent by a SILVERSON® pump (to de-agglomerate the carbon solids) into a recirculating frac tank for storage before shipping.

Caustic soda is injected into a coal burning flue gas stream at a point where the flue gas temperature is around 800° F. to 600° F. Chemicals in the caustic soda include CaO (calcium oxide), $Na_2CO_3$ (sodium carbonate), $Na_2S$ (sodium sulfide), and NaOH (sodium hydroxide). As these ingredients are injected into the coal burning flue gas steam they react with $CO_2$ to form mostly sodium bicarbonate. The activated carbon will be injected with a slip stream of hydrobromic acid to clean the lime from the pores of the carbon to activate and give the carbon more porosity to store gases and mercury from the flu gas stream. The injections will take place at from 800° F. to 600° F. to give time to drive off the water and leave the solids to react with the $CO_2$, $SO_2$, $SO_3$, and oxidized mercury.

EXAMPLE 2

Green Liquor from a Kraft pulp mill is injected into flue gas from a natural gas fired boiler. Injections start after the economizer area where the flue gas temperature is about 800° F. The Green Liquor is turned into a spherical shape of 100 to 200 micron from the 800° F. to 600° F. heat on the hot side flue gas ducting.

Washed carbon material goes through a carbon slurry metering pump and a metered injection of hydrobromic acid or hydrochloric acid or both is used to clean the caustic sodas and calcium carbonate from the pores in the carbon. A (KOFLO™) inline mixer insures that a good reaction takes place and makes the impregnated caustic sodas release from the pores in the carbon (going from a pH of 11 to a pH of 7).

The washed carbon is injected into the flue gas using an external atomizing spray system that helps to drive the salts from the pores in the carbon, leaving a clean pore structure while atomizing the activated carbon to react with and store oxidized mercury in the pore structure.

The Green Liquor contains sodium carbonate, sodium hydroxide, and sodium sulfide which react with $CO_2$, $SO_2$ and $SO_3$ to form sodium bicarbonate and sodium bisulfite. An electrostatic precipitator (ESP) is installed to collect the resulting sodium bicarbonate and sodium bisulfite. If baghouse filters are used, a greater retention of $CO_2$ is obtained. The resulting bicarbonates and bisulfites can be land filled or sold with flyash to concrete plants.

EXAMPLE 3

Green Liquor from a Kraft pulp mill clarifier is removed using a bottom dregs screw and pump system. The temperature coming out of the green liquor clarifier is approximately 140° F. and at this temperature the dregs are flowable. A first 50 gpm centrifuge has a hydraulic pump which feeds the green liquor dregs into the centrifuge. The first centrate is sent to a recirculating storage tank for shipping to a coal burning or natural gas burning power plant.

A second centrifuge receives a hot spray washed carbon slurry from the first centrifuge. The second centrate is sent to a green liquor weak wash tank. The friable caked carbon material is hot spray washed again and sent to a third and final centrifuge. Here the centrate is again sent to the weak wash storage tank and the friable cake is again diluted by a hot spray wash into a pumpable slurry sent by a SILVERSON® milling pump to a recirculating tank for shipping. The milling pump de-agglomerates larger particles to about a 12 micron diameter to accommodate suspension and alleviate tip clogging in the spray injection system at the power plants.

EXAMPLE 4

Kraft mill precipitated lime and white liquor can be used to remove sulfur dioxide from coal fired plants. Removal of the precipitated lime cuts costs at the Kraft mill and ends or reduces major land filling while producing a product to sell for use in the coal fired power plant. Just after the white liquor clarifier and before water is added to the lime mud via the mud mixer, a portion of the precipitated lime and white liquor is removed. The portion removed is equal to the amount the Kraft mill would otherwise discard to be land filled.

The lime mud and white liquor are pumped through an inline milling system to mill the larger lime particles to about 12 microns. The resulting solution or slurry is then be injected into the flue gas stream of a coal fired power plants for $SO_2$ removal.

EXAMPLE 5

The total flow of a Kraft mill white liquor and precipitated lime is processed through a hydro-cyclone system. During this process, about 80% of the white liquor is sent back to the white liquor clarifier. This saves not only on slaking to produce white liquor but the washing of the white liquor from the precipitated lime by the lime mud washer. The remaining 20% flow is mixed with the fines removed from the precipitated lime by the hydro-cyclone system. The solution can then be injected into the flue gas stream of coal fired plants for $SO_2$ removal.

The main precipitated lime will have mill water added and the precipitated lime continues to the mud washer. After the mud washer has washed the remaining white liquor from the precipitated lime, a final cut of lime will be discharged and can be sold for agricultural use. This lime will also be milled to 12 microns to produce a very fine lime that disperses though spray injection, penetrates soil, and is easily injected with irrigation. The cut can be made after the mud washer or after the lime filter and before the lime kiln, depending on which stream has a suitable salt level.

From the above descriptions, it is clear that the presently disclosed and claimed inventive concepts are well-adapted to carry out the objects and to attain the advantages mentioned herein, as well as those inherent in the presently disclosed and claimed inventive concept. While the presented embodiments have been described for purposes of this disclosure, it will be understood that numerous changes may be made which will readily suggest themselves to those skilled in the art and which are accomplished within the spirit of the presently disclosed and claimed inventive concepts.

What is claimed is:

1. A process for removing mercury from a mercury-containing flue gases, the process comprising:
    injecting hydrobromic acid and particulate carbon into a flue gas at a point where the flue gas has a temperature less than 800° F., the particulate carbon having been removed as dregs from a pulp mill green liquor clarifier;
    oxidizing mercury present in the flue gas and adsorbing the mercury on the particulate carbon; and
    removing the particulate carbon with mercury adsorbed from the flue gas.

2. The process of claim 1, wherein the hydrobromic acid is added to the particulate carbon as a slip stream prior injection into the flue gas.

3. The process of claim 1, wherein the particulate carbon is injected into the flue gas as a slurry.

4. The process of claim 1, wherein the hydrobromic acid and the particulate carbon are injected as a mixture into the flue gas.

5. The process of claim 4, wherein the particulate carbon is washed with water prior to mixing with the hydrobromic acid.

6. The process of claim 1, wherein the hydrobromic acid and particulate carbon are injected into the flue gas at a point where the flue gas has a temperature of less than 650° F.

7. The process of claim 1, wherein the particulate carbon with adsorbed mercury is removed in a separator selected from the group consisting of an ESP filter, baghouse, and combination thereof.

8. The process of claim 7, wherein $CO_2$, $SO_2$, and $SO_3$ are adsorbed on the particulate carbon and removed in a separator selected from the group consisting of an ESP filter, baghouse, and combination thereof.

9. The process of claim 1, further comprising addition of a slurry of sodium hydroxide and calcium carbonate into the flue gas at a temperature less than 900° F.

10. The process of claim 9, wherein the sodium hydroxide and calcium carbonate are present in green liquor from a Kraft pulp mill.

11. A process for removing sulfur from a flue gas containing $SO_2$, the process comprising:
    removing green liquor dregs from a pulp mill green liquor clarifier;
    pumping the removed green liquor dregs through an inline milling device to reduce particles present in the green liquor dregs to less than about 12 microns; and
    injecting the milled dregs into a flue gas stream to remove $SO_2$ therefrom.

12. A process for removing sulfur from a flue gas containing $SO_2$, the process comprising:
    removing precipitated lime and white liquor waste from a Kraft milling process;
    pumping the removed precipitated lime and white liquor through an inline milling device to reduce particles present to less than about 12 microns; and
    injecting the milled precipitated lime and white liquor into a flue gas stream to remove $SO_2$ therefrom.

* * * * *